POWER DIVIDER

Filed Jan. 4, 1960

INVENTOR.
ERNEST J. WILKINSON

BY Spencer E. Olson

ATTORNEY

United States Patent Office 3,091,743

Patented May 28, 1963

3,091,743

POWER DIVIDER

Ernest J. Wilkinson, Westwood, Mass., assignor to Sylvania Electric Products Inc., a corporation of Delaware Filed Jan. 4, 1960, Ser. No. 433
6 Claims. (Cl. 333—9)

This invention relates generally to microwave apparatus, and is more particularly concerned with an improved power divider capable of distributing input radio frequency energy equally between any selected number of output loads.

Radio frequency power dividers have many applications, some of which impose more stringent operational characteristics than others. In the field of phased arrays, for example, it is desirable to divide an input signal into a plurality of equi-phase, equi-amplitude, non-interacting signal outputs, the number of outputs being odd or even in accordance with the requirements of a particular system. Prior art power dividers of which applicant is aware lack the features enumerated.

Representative of available power dividers is the multiple hybrid junction power divider shown in FIG. 1, a multiple output device consisting of a pyramidical arrangement of individual hybrid junctions. Each hybrid junction is essentially a lossless device, which at high frequencies is in the form of a metal enclosure at the junction of four transmission lines or waveguides. The two guides perpendicular to the input guide function as output channels for the divided input signal, whereas the remaining guide, not shown in FIG. 1, is provided with an impedance termination to absorb signal reflections. Thus, each of the junctions provides a pair of output signals identical in phase and amplitude. In order to obtain more than two output signals, a pyramidical structure consisting of a plurality of such junctions are required; that is, each of the signals from the first divider is again divided by two, each of the two outputs of the second pair of dividers is again divided by two, and so on, until the necessary number of outputs are provided. In addition to being physically complex, the multiple hybrid power divider is inherently lossy, particularly when the number of output channels inherently furnished by the pyramiding of the junctions exceeds the number required for a particular system. For example, in a system requiring a nine-way power divider, if a divider of the type shown in FIG. 1 is to be used, it would be necessary to provide a pyramidical structure consisting of four hybrid layers which unavoidably provides sixteen output channels, the seven excess channels being loaded by power absorbing terminations to prevent undesirable reflections within the divider structure. This type of divider provides a selected plurality of equi-phase, equi-amplitude and non-interacting output signals, but at the expense of unused structure and attenuation of a portion of the input signal.

Another available type of power divider is the so-called coaxial line divider shown in FIG. 2, consisting of a coaxial line, the center conductor of which is tapped at various points about its circumference, with the tapped connections coupled to and terminated by external output connectors. A divider of this kind is capable of accommodating any number of output loads, odd or even, but all of the output channels are electrically common and consequently incapable of providing adequate isolation between the output signals. Accordingly, should one or more of the outputs be improperly matched to its load, signal reflections occurring on the mismatched output channel are coupled to all of the other channels, thus disturbing the phase and amplitude distribution of the output signals on the respective channels.

With an appreciation of the foregoing limitations of prior art devices, applicant has as the primary object of the present invention to provide an improved power divider capable of dividing an input signal into a plurality of equi-phase, equi-amplitude and non-interacting signals.

Another object of the invention is to provide a power divider having the foregoing features and which accomplishes power division without significant loss.

Another object of the invention is to provide a power divider having the foregoing features and advantages which is of simple mechanical construction.

Briefly, the power divider in accordance with the invention consists of a coaxial transmission line structure having hollow cylindrical inner and outer conductors, the inner conductor of which is split into a plurality of equal length circumferentially spaced splines, the number of splines being equal to the desired number of output channels. All of the splines are shorted together at the input to accommodate a common input terminal, and at the output end, each of the splines is connected to a suitable terminating resistor. The terminating resistors are of identical value, one terminal of each of which is connected to an electrically neutral or common junction. A signal applied to the input terminal divides equally among the plurality of splines, each of which with the outer conductor functions as a transmission line, and the terminating resistors in conjunction with the splines prevent interaction of the output signals. The input impedance of the divider is matched to the characteristic impedance of each of the output transmission lines when the conditions for isolation are satisfied, and consequently does not introduce discontinuities in the system in which it is used.

Other objects, features, and advantages of the invention will become apparent from the following detailed description, taken in conjunction with the accompanying drawings, in which.

Figure 1:
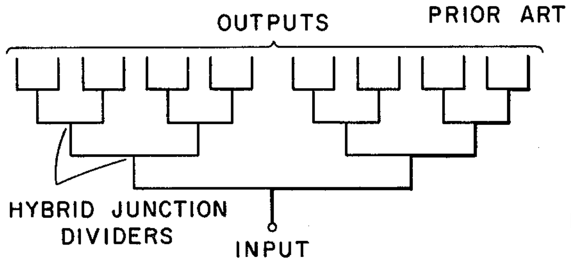
FIGS. 1 and 2 are schematic representations of prior art dividers briefly described above and to which further reference will not be made.
Figure 2:
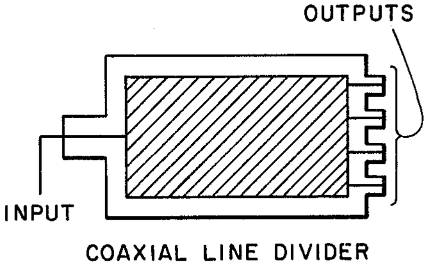
Figure 3:
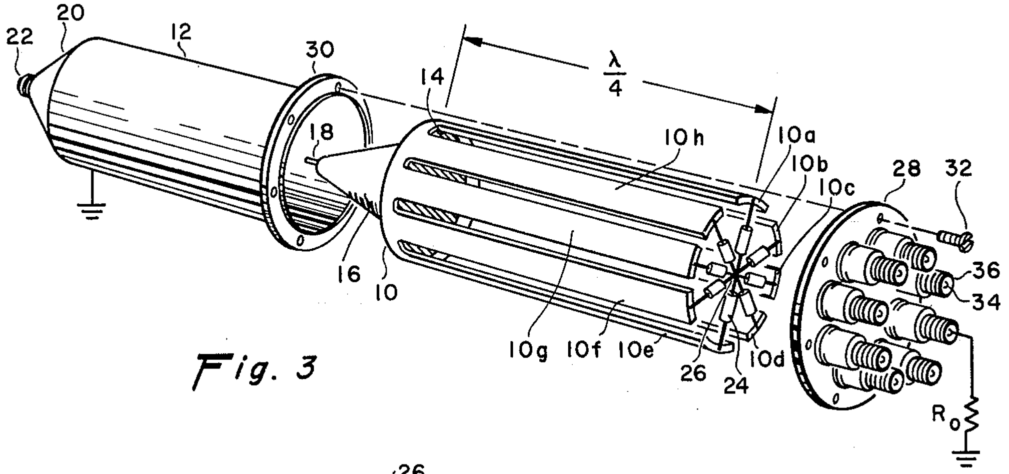
FIG. 3 is an exploded isometric view of a preferred embodiment of the power divider in accordance with the invention.

Referring to FIG. 3, the power divider according to the invention comprises a coaxial structure including a hollow inner conductor 10 and an outer conductor or shell 12 of somewhat larger diameter. Inner conductor 10 is split into a plurality (eight in the illustrated embodiment) of splines 10*a*, 10*b*, 10*c*, 10*d*, 10*e*, 10*f*, 10*g*, and 10*h*, of equal width and symmetrically circumferentially distributed. Each of the splines has a length equal to $$\frac{\lambda}{4}$$

at the nominal operating frequency, and with the outer conductor 12 forms a quarter-wave transmission line. The splines are shorted together at the input end, as by a circular shorting plate 14, to which, in turn, is secured a tapered conductor 16 having a pin conductor 18 at its apex. The tapered member 16 in cooperation with a similarly tapered portion 20 of the outer shell 12 provides a constant impedance transition section to reduce discontinuity capacitance. The outer conductor 22 of a standard coaxial connector is affixed to the smaller end of the tapered section 20 and with pin 18 affords a connector to which a coaxial line may be coupled.

At the other end of the structure, to the end of each of the splines is connected one terminal of a resistor 24, each having a resistance value of $R_x$, the other terminal of all of the resistors being connected together at a common electrical neutral or "floating" point 26. The resistors are conveniently oriented in the illustrated radial arrangement, but the common tie point may be assigned to any location within the inner conductor 10 so long as its displacement from all of the splines is small relative to the minimum wave length of the input signal.

The structure is closed at the output end by a conductive cover plate 28 secured to a flange 30 on the outer casing 12, as by screws 32. The cover plate supports a plurality of coaxial connectors, equal to the number of splines, each having an inner conductor 34 and an outer conductor 36. The outer conductor of each of the connectors is electrically connected to cover plate 28, and the inner conductors are connected to the terminal of corresponding ones of the splines 10*a*–10*h*. Thus, each of the transmission lines formed by a spline and the outer casing 12, each of which lines has the same characteristic impedance $Z_0$, may be connected to a separate external load, one of which is shown as being resistive and of a value $R_0$.

In operation, power applied to input terminal 22 divides symmetrically at the junction of the splines and propagates along the equi-length transmission lines formed by each spline and the outer shell, to provide at the output terminals equi-phase, equi-amplitude signals. By proper choice of the value of the resistors 24, and the characteristic impedance of the lines formed by each spline and the outer shell, interaction between the plural output signals is substantially eliminated. If a signal is reflected back into one of the output terminals from its load, because of mismatch of the load with the power divider, the signal upon re-entering the output terminal is divided between the related transmission lines and the resistor 24 connected to the terminus thereof. That portion of the reflected signal propagated by the splined transmission line travels a distance $$\frac{\lambda}{4}$$

along the line toward the input end where it is subdivided amongst the other transmission lines through the shorting plate 14. The subdivided signals are then again propagated along their respective transmission lines toward the output terminals, the incident reflected signal therefore being propagated along a path $$\frac{\lambda}{2}$$

in length before again reaching the terminating resistors 24. Remembering that the initial reflected signal was divided between a transmission line and its associated load resistor, and assuming no appreciable phase shift in the signal applied to the resistor, the latter signal is divided at the common junction 26 among the other load resistors. By reason of the half-wave length difference in the length of the propagation paths of the portion of the reflected signal which was transmitted toward the input end along one transmission line and divided and propagated back to the resistor and the portion of the reflected signal divided at the junction 26 and applied through the resistors to the other splines, essentially complete cancellation of the reflected signal takes place at the junction of the resistors with their respective splines. By proper selection of the value of resistors 24 and the characteristic impedance of the plural transmission lines, the two parts of the reflected wave are in phase opposition and equal amplitude at the terminii of the splines so that complete cancellation is realized. Consequently, the other output channels are totally unaffected by a mismatch in one of the channels.

Figure 4:
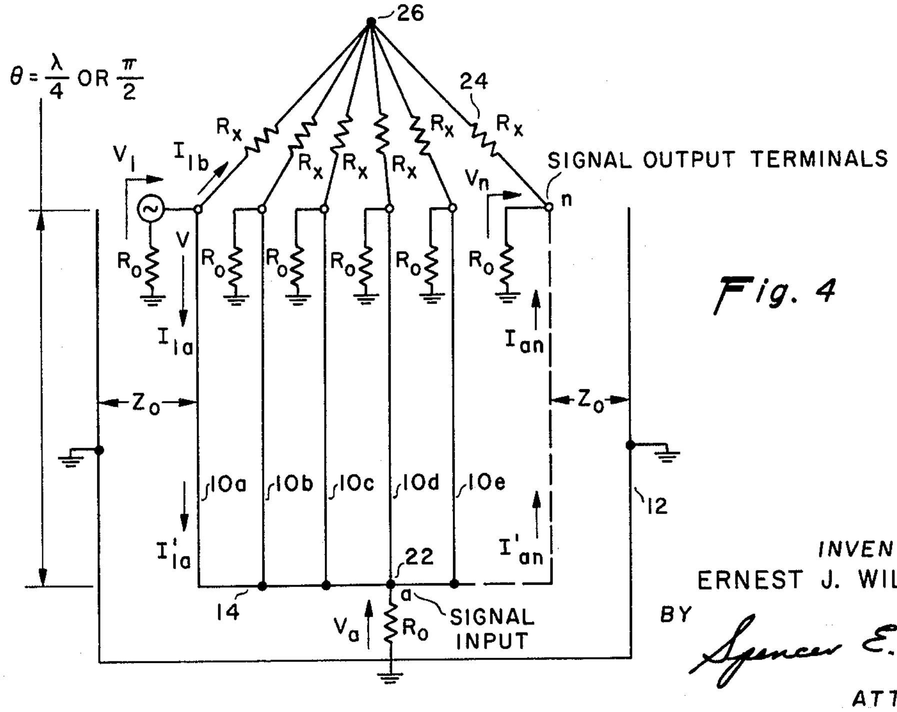
FIG. 4 is an equivalent circuit of the power divider of FIG. 3 and its normal associated circuitry.

For a derivation of the proper values for resistors 24 and the load impedance and a better understanding of the operation of the power divider, reference is made to FIG. 4 which is an equivalent circuit of the divider and its associated input and output circuitry. Five of the splined transmission lines 10*a*–10*e* are shown in full line and a sixth transmission line, shown dotted, represents the last of a plurality of *n* lines which may be provided in the power divider. Each of the splines in cooperation with the outer shell 12 forms a transmission line having a characteristic impedance $Z_0$, the output terminals of each of the lines being connected through a resistor 24 of value $R_x$, to common junction 26. The output terminals are each connected to an external load, each having a value of $R_0$, equal to the characteristic impedance of each of the lines. The source of input signals is coupled to point 22, the source having an internal impedance $R_0$ so as to also be matched to the divider. Considering first a condition of mismatch of the load associated with transmission line 10*a*, the reflected signal may be regarded as a voltage V applied to the output terminal of that line by a generator having an internal resistance $R_0$. Because of the symmetry of the circuit, with $$\theta=\frac{\lambda}{4} \text{ or } \frac{\pi}{2}$$

the voltages $V_n$ appearing at the other output terminals must all be equal. Applying well-known transmission line equations to line 10*a*, $$V_1=V_a\cos\theta+jI'_{1a}Z_0\sin\theta=jI'_{1a}Z_0$$
$$I_{1a}=I'_{1a}\cos\theta+j\frac{V_a}{Z_0}\sin\theta=j\frac{V_a}{Z_0}$$
$$V_a=V_n\cos\theta+jI_{an}Z_0\sin\theta=jI_{an}Z_0$$
$$I'_{an}=I_{an}\cos\theta+j\frac{V_n}{Z_0}\sin\theta=j\frac{V_n}{Z_0}$$

Equations 1

The following is also true:

$$I'_{1a}=\frac{V_a}{R_0}+(n-1)I'_{an}$$
$$I_{an}=\frac{V_n}{R_0}-\frac{I_{1b}}{n-1}$$
$$(I_{1b}+I_{1a})R_0=V-V_1$$
$$\left(I_{1b}+\frac{I_{1b}}{n-1}\right)R_x=V_1-V_n \quad \text{Equations 2}$$

Combining Equations 1 with Equations 2, the following set of simultaneous equations are obtained for the unknown voltages $V_1$, $V_a$ and $V_n$:

$$V_a+j(n-1)\frac{R_0}{Z_0}V_n+jV_1\frac{R_0}{Z_0}=0$$
$$jV_a\frac{R_0}{Z_0}+\left(1+\frac{R_0}{nR_x}\right)V_n-V_1\frac{R_0}{nR_x}=0$$
$$jV_a\frac{R_0}{Z_0}-\left(\frac{n-1}{n}\right)\frac{R_0}{R_x}V_n+V_1\left[1+\frac{R_0}{R_x}\left(\frac{n-1}{n}\right)\right]=V$$

Equations 3

For perfect isolation between the output terminals, $V_n=0$, whereby Equations 3 may be combined to yield:

$$\frac{V_1}{V}=\frac{1}{1+\frac{R_0}{R_x}}$$
$$\frac{(R_0)^2}{Z_0^2}=\frac{R_0}{nR_x} \quad \text{Equations 4}$$

For matched output admittances between the divider and the output transmission line, $$Y_1=\frac{I_{1b}+I_{1a}}{V_1}=\frac{V-V_1}{R_0V_1}=\frac{1}{R_0} \quad \text{Equation 5}$$

Combining Equations 4 and 5 yields:

$$R_x=R_0$$
$$Z_0=\sqrt{n}R_0 \quad \text{Equation 6}$$

It is seen from Equation 6 that the impedance relationship necessary to provide isolation between the output terminals also affords a condition of match between the inputs and outputs of the divider. The input impedance, it will be seen from the foregoing equations, is equal to the parallel combination of the $n$ transmission line impedances $R_0$ after each has been transferred through a quarter-wave length transmission line of impedance $Z_0$. Hence, $$Z\text{ input}=\frac{Z_0^2/R_0}{n}=\frac{Z_0^2/R_0}{Z_0^2/R_0^2}=R_0$$

or, in other words, the input impedance of the divider is also matched to the characteristics of the output transmission line when the conditions for isolation specified in Equations 6 are satisfied.

From the foregoing analysis it will be appreciated that in principle there are no limitations on the number of output channels the divider may have, or any restraints on the upper and lower frequencies at which the divider may be utilized. The divider being roughly a quarter-wave length long at the frequency of operation, it will be appreciated that there are practical limits on the frequencies that can be handled by reason of physical size of the device. At low frequencies the divider would be of unwieldy size, and at high frequencies the tolerances of the dimensions and the requirement for locating the floating junction 26 at a prescribed minimum distance from all of the splined lines imposes some difficulty. In a divider which has been designed for operation at a frequency of 500 megacycles, the isolation between output terminals was generally uniform between 450 and 500 megacycles with a minimum isolation at 500 megacycles of about −27 db. These characteristics were exhibited by an eight-way divider of the type illustrated in FIG. 3. It will be apparent from these results that although the spline transmission lines have been designated as having a length $$\frac{\lambda}{4}$$

at the midrange of the operating frequency, that a ±5 percent variation in the input frequency can be handled with satisfactory performance.

From the foregoing it is seen that applicant has provided a power divider which divides a signal into $n$ equal parts, where $n$ may be odd or even. The device preserves equality of phase and amplitude of the outputs independent of frequency over an operating range, and also provides isolation between outputs over a limited range of frequencies. All terminals are matched to their respective loads over the same frequency band, with the consequence that the divider introduces negligible discontinuity in the transmission line in which it is connected.

While there has been described what is, at present, considered a preferred embodiment of the invention, it will now be apparent to one skilled in the art that many and various changes and modifications may be made without departing from the spirit of the invention. It is intended, therefore, that all those changes and modifications as fairly fall within the scope of the appended claims be considered as a part of the present invention.

What is claimed is:

1. A microwave power divider comprising, a plurality of two-conductor transmission lines each approximately a quarter-wavelength long at the frequency of operation and each having the same characteristic impedance, means connecting like conductors of said transmission lines together at one end thereof, means for coupling an input signal to said one end of said transmission lines, a like plurality of resistors each having a resistance equal to the quotient of said characteristic impedance divided by the square root of the number of transmission lines, means connecting one terminal of said resistors to the other end of corresponding ones of said like conductors, means connecting the other terminals of said resistors together at an otherwise unconnected terminal, and a like plurality of output terminals connected to said other end of corresponding ones of said like conductors.

2. A microwave power divider comprising, inner and outer coaxial hollow conductors, said inner conductor being approximately a quarter-wavelength long at the frequency of operation and having a plurality of longitudinal slots therein defining a plurality of like circumferentially spaced apart splines each of said splines with said outer conductor constituting a transmission line having the same characteristic impedance, means conductively connecting said splines together at one end thereof, means for coupling an input signal to said one end of said transmission lines, a like plurality of resistors each having a resistance equal to the quotient of said characteristic impedance divided by the square root of the number of splines, means connecting one terminal of said resistors to the other end of corresponding ones of said splines, means connecting the other terminals of said resistors together at an otherwise unconnected terminal, and a like plurality of output terminals connected to said other end of corresponding ones of said splines.

3. A microwave power divider comprising, inner and outer coaxial hollow conductors, said inner conductor being approximately a quarter-wavelength long at the frequency of operation and having a plurality of slots extending lengthwise thereof defining a plurality of like circumferentially spaced splines, each of said splines with said outer conductor constituting a transmission line having the same characteristic impedance, means conductively connecting said splines together at one end thereof, a like plurality of resistors each having a resistance equal to the quotient of said characteristic impedance divided by the square root of the number of splines, means connecting one terminal of each of said resistors to the other end of corresponding ones of said splines, means connecting the other terminal of said resistors together at a common point positioned internally of said inner conductor, and means for coupling an input signal to said one end of said transmission lines.

4. A microwave power divider comprising inner and outer substantially coextensive inner and outer coaxial hollow conductors, said conductors being approximately a quarter-wavelength long at the frequency of operation, said inner conductor having a plurality of slots extending lengthwise thereof dividing said inner conductor into a plurality of like circumferentially spaced splines, each of said splines with said outer conductor constituting a transmission line having equal characteristic impedances, means conductively connecting said splines together at one end thereof, a like plurality of resistors each having a resistance equal to the quotient of said characteristic impedance divided by the square-root of the number of splines, said resistors being positioned radially within said inner conductor at the other end thereof with one terminal of each connected to the other end of a corresponding one of said splines and the other terminals connected together, and a like plurality of output terminals connected to said other end of corresponding ones of said splines.

5. A microwave power divider comprising inner and outer substantially coextensive inner and outer coaxial hollow conductors, said conductors being approximately a quarter-wavelength long at the frequency of operation, said inner conductor having a plurality of slots extending lengthwise thereof dividing said inner conductor into a plurality of like circumferentially spaced splines, each of said splines with said outer conductor constituting a transmission line having equal characteristic impedances, means conductively connecting said splines together at one end thereof, a tapered transition connected to said one end of said inner and outer conductors for coupling energy thereto, a like plurality of resistors each having a resistance equal to the quotient of said characteristic impedance divided by the square-root of the number of splines, said resistors being positioned radially within said inner conductor at the other end thereof with one terminal of each connected to the other end of a corresponding one of said splines and the other terminals connected together, a cover plate conductively secured to said other end of said outer conductor, and a like plurality of coaxial output connectors supported on said cover plate with the center conductors thereof conductively connected to said plate and the inner conductors connected to said other end of corresponding ones of said splines.

6. A microwave power divider comprising, a plurality of two-conductor transmission lines a first conductor of each of which is common to all said lines, said lines each being approximately a quarter-wavelength long at the frequency of operation and having substantially equal characteristic impedances, means connecting the second conductors of said transmission lines together at one end thereof, means for coupling a signal the power of which is to be divided to said one end of all of said transmission lines, a like plurality of resistors each having a resistance equal to the quotient of said characteristic impedance divided by the square root of the number of transmission lines, means connecting one terminal of said resistors to the other end of corresponding ones of said second conductors, means connecting the other terminal of said resistors together at an otherwise unconnected common point, and a like plurality of output terminals connected to said other end of corresponding ones of said second conductors.

References Cited in the file of this patent

UNITED STATES PATENTS

| | | |
|---|---|---|
| 2,417,895 | Wheeler | Mar. 25, 1947 |
| 2,506,132 | Brown | May 2, 1950 |